Patented July 8, 1952

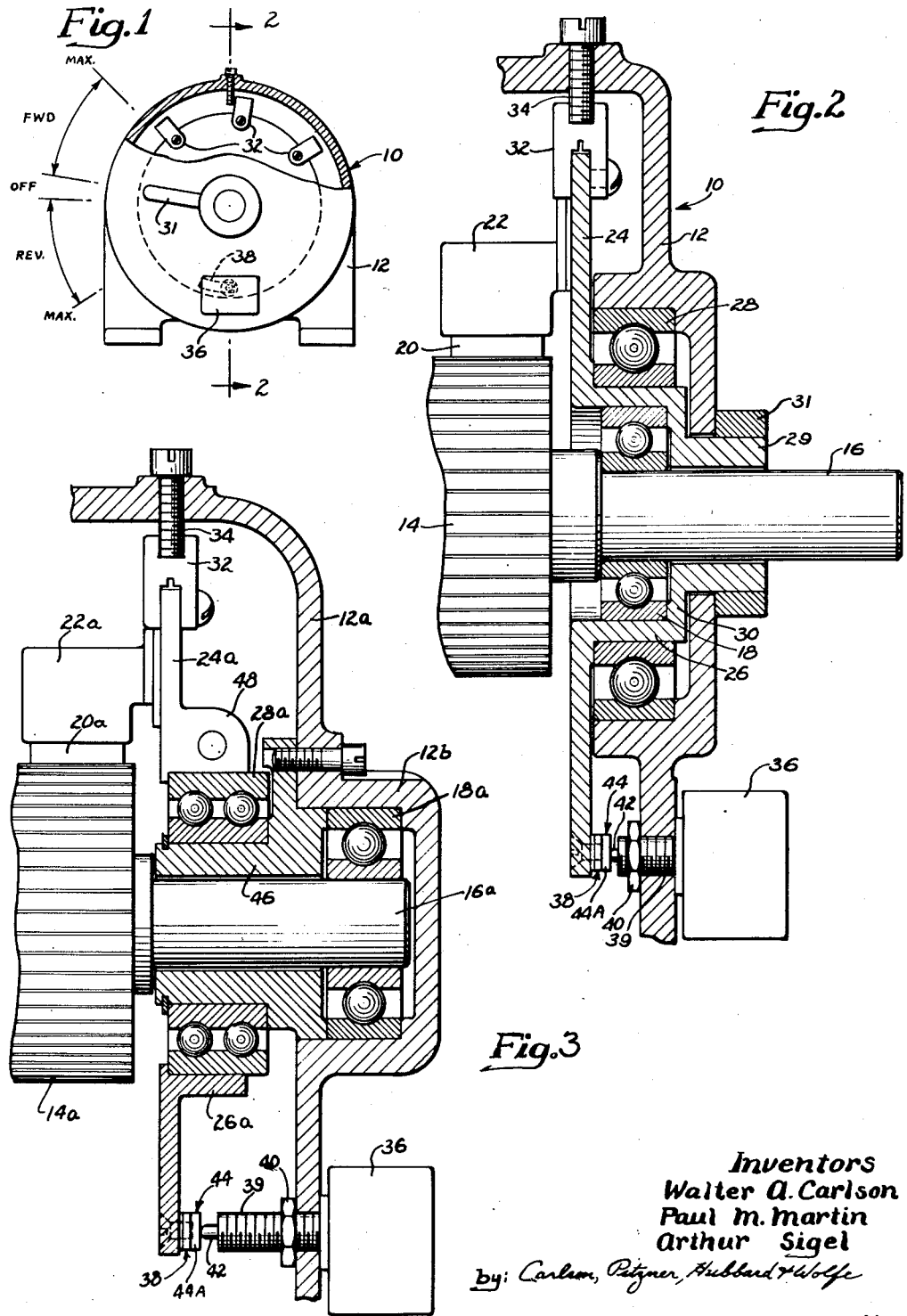

2,602,830

UNITED STATES PATENT OFFICE 2,602,830

CONTROL DEVICE FOR DYNAMOELECTRIC MACHINES

Walter A. Carlson, Cicero, Paul M. Martin, Chicago, and Arthur Sigel, Morton Grove, Ill., assignors to Northwestern Electric Company, Chicago, Ill., a corporation of Illinois Application June 16, 1950, Serial No. 168,516

8 Claims. (Cl. 171—323)

The present invention relates generally to the operational control of commutator-type dynamo-electric machines and more particularly to improvements in control devices employing the principles of brush shifting for regulating the operation of such machines.

One object of the present invention is to provide a new and improved control device for a commutator-type dynamo-electric machine which is effective to completely control the operation of the machine including the application of power to the machine, the variation of its speed between zero and maximum in both forward and reverse directions, and which at the same time facilitates its operation and minimizes wear on the parts of the machine so as to reduce necessary maintenance and prevent erratic operation.

Another object of the invention lies in the provision of a brush shifting device of the foregoing character which may readily be incorporated in dynamo-electric machines of either the explosion-proof type or the open frame type.

The objects of the invention thus generally set forth, together with other objects and ancillary advantages are attained by the construction and arrangement shown by way of illustration in the accompanying drawings in which:

Figure 1 is an end elevation partly in section of an electric motor in which the present invention is incorporated.

Fig. 2 is a fragmentary vertical section on an enlarged scale taken substantially in the plane of line 2—2 in Fig. 1.

Fig. 3 is a fragmentary vertical section similar to Fig. 2 but illustrating another form of the invention.

While the invention is susceptible of various modifications and alternative constructions, there are shown in the drawing and will herein be described in detail the preferred embodiments, but it is to be understood that it is not intended thereby to limit the invention to the specific forms disclosed, but it is intended to cover all modifications and alternative constructions falling within the spirit and scope of the appended claims.

For purposes of illustration, the present invention has been shown in connection with a conventional single-phase A. C. motor of the repulsion type. Employing the principles of brush shifting for controlling the operation of such motors has numerous advantages over all types of control means. Such other types commonly used include tap-changing transformers, auto-transformers such as Variacs and various resistance arrangements such as series rheostats. As compared to these types of control means, among the advantages of a control embodying brush shifting principles are the elimination of controls external to the motor with which it is employed, the elimination of power losses incident to the use of external controls, and the attainment of an infinitely variable speed control as distinguished from the step-by-step control afforded by such external control means. Additionally, speed controlled machines utilizing brush shifting principles can be manufactured more economically, can be operated more easily and economically, require less maintenance and occupy less space.

With the foregoing discussion in mind, it becomes apparent that motors of the type incorporating brush shifting means might find wide utility in many specific applications such as, for example, in coil winding machines, letter presses and other similar applications where accurate and continuously variable speed control is a requisite. There have been serious objections to prior forms of brush shifting control devices which have caused potential users to turn to other forms of motors and speed control devices.

Among the objections to prior brush shifting speed control constructions is the fact that they permitted wobbling of the brush carrier out of a plane transverse to the motor axis. Wobbling of the brush carrier obviously results in erratic movement of the brushes with respect to the motor commutator. This wobbling not only increases brush wear, but causes the brushes and motor commutator to wear unevenly. This leads to increased arcing between the brushes and the commutator with the undesirable results attendant thereto including erratic speed control. The steps taken to overcome this wobbling have usually comprised a reduction of clearance between the rotatable brush carrier and its support so as to eliminate play therebetween. This, however, made it more difficult to shift the brushes so that applications involving manual speed control, where an operator is required to almost continuously alter motor speed, became unduly fatiguing. The present invention overcomes these objections.

Turning now to the drawing, there shown is a motor generally designated 10 having a frame or casing 12 and an armature which terminates at one end in a segmental commutator 14. The armature is mounted on a shaft 16 which, as shown, is journaled for rotation about a horizontal axis in anti-friction bearings 18. Engageable with the commutator 14 are a plurality of brushes 20, only one of which is shown. The brushes 20 are, in turn, supported in holders 22.

In carrying out the invention, there is provided a carrier 24 for the brushes 20 and their holders 22 and means for supporting the carrier for rotation about the rotational axis of the motor 10, which means, while facilitating free rotation of the carrier in order to change the angle of displacement of the brush axis with respect to the stator field axis, is nevertheless effective to prevent wobbling of the carrier with respect to the axis of the motor shaft 16. Preferably, the means for supporting brush carrier 24 comprises an anti-friction bearing 28 of the radial-thrust type which is mounted on the motor frame.

In Fig. 2 of the drawing, the invention is shown incorporated in a motor of explosion-proof construction, that is to say, all the components of the motor are enclosed within a flame-tight casing so as to prevent detonation if the motor should be operated in an atmosphere laden with an explosive mixture. In this form of the invention, the carrier 24 comprises a generally circular plate having a central hub portion 26 formed integral therewith. To support the carrier, an anti-friction bearing 28 is provided which is preferably of the single row, ball type. The bearing 28 is held in a recess formed in the end of the motor frame 12. Within the bearing is received the hub portion 26 of the carrier 24.

To maintain the explosion-proof character of the motor 10, the brush carrier 24 is constructed and arranged to be accessible for rotation from the exterior of the casing 12 without impairing the closed, flame-proof nature of the casing. In the present instance, this is accomplished by fashioning the carrier 24 with a central sleeve portion 29 of smaller diameter than the carrier hub portion 26. The sleeve 29 is joined to the hub portion 26 by means of a radially extending disk-like web 30. The sleeve 29 extends outwardly along the motor shaft so as to project beyond the motor casing for attachment of an operating lever 31 thereto by means of which the carrier 24 and the brushes 20 can be shifted. It is to be noted especially that the motor casing 12 terminates just short of the sleeve portion 29 of the carrier 24 and thus overlies the radial web 30 of the carrier, being spaced therefrom only a sufficient distance so that there will be no drag of the shoulder on the inner surface of the casing.

In this instance, the shaft bearing 18 received within the hollow hub portion 26 of the brush carrier 24.

In most applications in which variable speed motors find utility, there will be a series of operations performed which require armature rotation only in one direction with control between zero and maximum speed; then, there will be another series of operations requiring speed controlled rotation in the other direction. To facilitate speed control for such alternative operation, stop means is provided for limiting the rotation of the brush carrier 24. In the present instance, this stop means comprises a series of stop blocks 32 fastened to the periphery of the carrier 24 for coaction with a fixed stop rigid with the motor casing 12 As shown, the latter comprises simply a screw 34 threaded through the casing and extended inwardly for engagement by the stop blocks 32. As best seen in Fig. 1, the left hand and central blocks 32 determine the speed limits for rotation in one direction, and the right hand and central blocks determine the speed limits for rotation in the opposite direction. The change of direction of rotation can be effected simply by unscrewing the fixed stop 34 and shifting the carrier so that the central stop block will engage either one side or the other of the fixed stop 34 according to the direction of rotation desired and then repositioning the fixed stop 34.

If desired, the positions of the stop blocks can be changed along the carrier 24 between the positions shown in Fig. 1, wherein the left and right blocks are set substantially at the points of maximum speed, and any intermediate point so as to give any required range of speed control. Similarly, the central stop block 32 can be removed entirely if speed control from maximum in one direction to maximum in the other direction of rotation is desired.

In order to have complete motor control by means of the brush carrier, switch means operated by the carrier is provided to effect the application of power to the motor. To this end, a disconnect-switch 36 is utilized in conjunction with an actuator 38 therefor on the carrier 24. As shown, the switch 36 is fastened to the end of the motor casing 12 by means of a threaded sleeve 39 and a nut 40. Preferably, the switch 36 is of the two-position push type, including a push-pin 42 which is spring biased toward its outermost or "on" position. The actuator 38, as shown, is fashioned to provide an outwardly projecting boss 44 having tapered cam surfaces 44A for engagement with the push-pin 42 of the switch 36 to move the same inwardly into its innermost or "off" position.

The actuator 38 is affixed to the carrier 24 in a position diametrically opposite the central stop block 32. Thus, as the carrier 24 is moved to shift the brushes so as to reduce the motor speed, continued movement in such direction brings the motor speed down to zero and brings the boss 44 into engagement with the push-pin 42 of the switch 36, whereupon the pin will be pressed inwardly, disconnecting the motor from the power source.

In Fig. 3 of the drawing, another form of the present invention is illustrated. This form is intended for incorporation in an open frame type motor having a frame or casing 12a with the usual openings therein (not shown), and an armature which terminates at one end in a commutator 14a. The latter is peripherally engaged by brushes 20a which are carried in bush holders 22a.

The armature is fast on a shaft 16a which is journaled at one end in a bearing 18a. The latter is supported in a boss 12b formed in the end of the motor casing 12a. A retaining sleeve 46, which is secured to the casing 12a, serves to hold the bearing 18a in place.

To support the brushes 20a and their holders 22a, the carrier 24a is provided. The carrier 24a is much like the carrier 24 of the form of the invention previously described and thus comprises a circular plate having a hollow cylindrical hub portion 26a. Within the hub portion 26a is received an anti-friction bearing 28a which is preferably of the double row ball type. The bearing 28a is, in turn, supported on a retainer sleeve 46 and is thus held fixed with respect to the casing 12a. It is apparent, therefore, that the carrier and the brushes are supported for free rotation about the motor axis and at the same time are constrained to movement in a plane transverse to the motor axis. Thus, in this form, too, wobble of the carrier and the brushes is prevented.

This form of invention also includes the stop means 32—34 for determining the limits of angular movement of the carrier and brushes with respect to the motor axis, the disconnect switch 36 and the actuator 38 therefor which, as shown, are identical with those described in connection with Fig. 2.

Since this form of the invention is intended for incorporation in a motor of the open frame type, an operating lever, or the like (not shown), similar to the lever 32 may be attached directly to the central hub portion 26a of the carrier since the carrier is accessible from the exterior of the casing 12a through the openings normally found therein. If desired, the hub portion 26a may be provided with a lug 48 to facilitate the attachment of such a lever.

In view of the foregoing, it is apparent that with the present invention there has been attained in a single device embodying brush shifting principles a complete control for the operation of a dynamo-electric machine including the control of its speed from zero to maximum in either direction of rotation and the turning on and off of power to the machine. Single row bearings of the radial-thrust type and double row bearings, which are also radial-thrust type bearings, are of the general class conventionally referred to as loaded or preloaded. That is to say by their construction or arrangement such bearings are given a relatively tight internal fit or small clearance between their anti-friction elements and the races therefor so as to minimize relative motion other than relative rotary motion between their inner and outer rings. It will be appreciated, therefore, that a control device constructed in accordance with the present invention not only permits of free rotation of the brush carrier for shifting the brushes of the machine, but also prevents irregular movement of the brush carrier and thus eliminates uneven brush wear, undue arcing between the brushes and commutator, and erratic speed control.

We claim as our invention:

1. In a dynamo-electric machine having a casing and including an armature fast on a bearing-supported shaft and terminating at one end in a segmental commutator with brushes engaging the same, a control device comprising a carrier for the brushes including a member to which the brushes are fixed and having an axially elongated central hollow hub portion, an anti-friction radial-thrust type bearing disposed about said hub portion and supported on the casing and journalling said carrier for free rotation about the rotational axis of the machine but constraining the same to rotational movement in a plane transverse to said axis, said carrier also serving as a retainer for the shaft bearing.

2. In a dynamo-electric machine having a casing and including an armature fast on a shaft and terminating at one end in a segmental commutator with brushes engaging the same, a control device comprising a carrier for the brushes including a member to which the brushes are fixed and having an axially elongated central hollow hub portion, an anti-friction radial-thrust type bearing disposed about said hub portion and supported on the casing and journalling said carrier for free rotation about the rotational axis of the machine but constraining the same to rotational movement in a plane transverse to said axis, a second anti-friction bearing received within said hub portion for journalling the armature shaft.

3. In a dynamo-electric machine having a casing and including an armature fast on a shaft and terminating at one end in a segmental commutator with brushes engaging the same, a control device comprising a carrier for the brushes including a rigid member to which the brushes are fixed and having an axially elongated central hollow hub portion, an anti-friction radial-thrust type bearing disposed about said hub portion and supported on the casing and journalling said carrier for free rotation about the rotational axis of the machine but constraining the same to rotational movement in a plane transverse to said axis, a second anti-friction bearing received within said hub portion for journalling the armature shaft, said carrier having a coaxial sleeve portion rigid with said hub portion extending through the casing about the armature shaft, and means fixed to said sleeve portion exteriorly of the casing for rotating the carrier so as to shift the position of the brushes.

4. In a dynamo-electric machine having a casing and including an armature fast on a bearing supported shaft and terminating at one end in a segmental commutator with brushes engaging the same, a control device comprising, in combination, a bearing-supported carrier for the brushes including a generally circular plate to which the brushes are secured, stop means for limiting rotational movement of said carrier, said means including a set of stops fixed to said carrier and movable therewith and a fixed stop rigid with the casing for alternative engagement by said movable stops so as to determine the speed limits of armature rotation, a disconnect switch for controlling application of power to the machine, and an actuator for said switch rigid with said carrier in a predetermined position relative to one of said movable stops whereby said switch is operated to disconnect the machine from its power source as the carrier is moved to bring said one stop into engagement with said fixed stop and said switch is operated to connect the machine with its power source as said movable stop is moved from engagement with said fixed stop upon movement of said carrier.

5. In a dynamo-electric machine having a casing and including an armature supported on a shaft and terminating at one end in a segmental commutator with brushes engaging the same, a control device for the machine comprising, in combination, a carrier for the brushes including a plate to which the brushes are secured and having a central hub portion formed integral therewith, an anti-friction radial-thrust type bearing supported by the casing and journalling said carrier for free movement about the rotational axis of the machine but constraining the same to movement only in a plane transverse to said axis, said hub portion serving as a retainer for said bearing, and stop means interposed between said carrier and the casing of the machine effective to limit rotational movement of the carrier whereby to determine the speed limits of armature rotation.

6. In a dynamo-electric machine having a casing and including an armature supported on a shaft and terminating at one end in a segmental commutator with brushes engaging the same, a control device for the machine comprising, in combination, a carrier for the brushes including a plate to which the brushes are secured and having a central hub portion formed integral therewith, an anti-friction radial-thrust type bearing supported by the casing and journalling said carrier for free movement about the rotational axis of the machine but constraining the same to movement only in a plane transverse to said axis, said hub portion serving as a retainer for said bearing, means including a lever having connection to said carrier for rotating the same, and stop means including at least two elements movable with said carrier and one element fixed with respect to the casing for limiting the rotational movement of said carrier.

7. In a dynamo-electric machine having a closed casing and including an armature fast on a shaft and terminating at one end in a segmental commutator with the shaft extending outwardly therefrom through an opening in said casing, a control device for the machine comprising, in combination, a set of brushes, a carrier for the brushes including a member to which the brushes are fixed and having a central hollow hub portion, an anti-friction bearing of the radial-thrust type supported on the casing for receiving said hub portion to journal said carrier for free rotation about the rotational axis of the machine and being effective to constrain the same to rotational movement in a plane transverse to said axis, a sleeve extending through the shaft opening in the casing and about the armature shaft, a radially disposed disk-like web connecting said sleeve and the hub portion of said carrier, means fixed to said sleeve exteriorly of the casing for rotating the carrier so as to shift the position of the brushes with respect to the armature, said web underlying and being disposed immediately adjacent the portion of the casing surrounding the shaft opening therein whereby the machine is maintained explosion-proof.

8. In a dynamo-electric machine having a closed casing and including an armature fast on a shaft and terminating at one end in a segmental commutator with the shaft extending outwardly therefrom through an opening in said casing, a control device for the machine comprising, in combination, a set of brushes, a bearing supported carrier for the brushes including a member to which the brushes are fixed journaled for independent rotation about the rotational axis of the machine, a sleeve extending through the shaft opening in the casing and about the armature shaft, a web connecting said sleeve and said carrier, means fixed to said sleeve exteriorly of the casing for rotating the carrier so as to shift the position of the brushes with respect to the armature, said web underlying and being disposed immediately adjacent the portion of the casing surrounding the shaft opening therein whereby the machine is maintained explosion-proof.

WALTER A. CARLSON.
PAUL M. MARTIN.
ARTHUR SIGEL.

REFERENCES CITED

The following references are of record in the file of this patent:

UNITED STATES PATENTS

| Number | Name | Date |
| --- | --- | --- |
| 662,580 | Vicarino | Nov. 27, 1900 |
| 1,268,330 | Darker | June 4, 1918 |
| 1,594,398 | Wolkoff | Aug. 3, 1926 |
| 1,708,541 | House | Apr. 9, 1929 |
| 2,193,515 | Kessel | Mar. 12, 1940 |

FOREIGN PATENTS

| Number | Country | Date |
| --- | --- | --- |
| 367,965 | Germany | Jan. 30, 1923 |